United States Patent [19]

Cooper

[11] Patent Number: 4,525,281

[45] Date of Patent: Jun. 25, 1985

[54] DEWATERING OF MINERAL SLURRIES

[75] Inventor: Ian V. Cooper, Georgetown, Canada

[73] Assignee: Dow Corning Corporation, Midland, Mich.

[21] Appl. No.: 520,369

[22] Filed: Aug. 4, 1983

[51] Int. Cl.$^3$ ............................................... C02F 1/56
[52] U.S. Cl. ..................................... 210/735; 210/728
[58] Field of Search .............. 210/710, 711, 725, 735, 210/727, 736, 728, 729; 209/5, 166, 167; 252/60, 61, 180, 181

[56] References Cited

U.S. PATENT DOCUMENTS

| | | | |
|---|---|---|---|
| 3,285,849 | 11/1966 | Watanabe | 210/728 |
| 3,355,424 | 11/1967 | Brown | 260/46.5 |
| 4,067,806 | 1/1978 | Mauceri | 210/728 |
| 4,207,186 | 6/1980 | Wang et al. | 210/54 |
| 4,210,531 | 7/1980 | Wang et al. | 210/51 |
| 4,231,868 | 11/1980 | Wang et al. | 210/728 |
| 4,290,896 | 9/1981 | Gordon et al. | 210/710 |
| 4,290,897 | 9/1981 | Swihart | 210/728 |
| 4,374,734 | 2/1983 | Newcombe | 210/728 |

FOREIGN PATENT DOCUMENTS 942587 11/1963 United Kingdom ................ 210/728

*Primary Examiner*—Ernest G. Therkorn
*Attorney, Agent, or Firm*—Richard A. Kaba

[57] ABSTRACT

Mineral slurries are effectively dewatered by a process employing an aminofunctional silicone emulsion as a dewatering aid. The process provides for mixing the dewatering aid with the aqueous mineral slurry and thereafter separating the treated slurry into a mineral portion and an aqueous portion. The use of the aminofunctional silicones provide for reduced moisture content and/or increased production rate in a mineral slurry dewatering process.

20 Claims, No Drawings

DEWATERING OF MINERAL SLURRIES

BACKGROUND OF THE INVENTION

This invention relates to a process for dewatering certain mineral slurries. More specifically, this invention relates to a process for dewatering aqueous slurries of aluminum ore, copper ore, iron ore, lead ore, silver ore, zinc ore, talc, and barite by the use of an emulsion containing an aminofunctional silicone as a dewatering aid.

Valuable components of numerous minerals are concentrated by various procedures to provide mineral concentrates that are further processed. One of the most widely used methods of concentration is froth flotation which is applicable to a wide variety of minerals. After a mineral has been sufficiently enriched in valuable component by concentrating, it is usually subjected to dewatering so that it may be shipped more economically and/or further processed more readily. In dewatering, the mineral concentrate in slurry form is subjected to filtration or equivalent processing to remove water therefrom. The removal of water decreases the weight of the concentrate and also reduces the energy requirements for subsequent evaporation of residual water when necessary such as for smelting.

Both surfactants and flocculating agents have been employed to assist the dewatering of mineral slurries. For example, U.S. Pat. No. 4,207,186 (issued June 10, 1980) discloses that a mixture of a hydrophobic alcohol and a nonionic surfactant can be employed as a dewatering aid for mineral slurries. U.S. Pat. No. 4,210,531 (issued July 1, 1980) teaches the use of a combination of a flocculant, an anionic surface active agent, and a water insoluble organic liquid for mineral slurry dewatering. U.S. Pat. No. 4,231,868 (issued Nov. 4, 1980) teaches the use of N-substituted sulfosuccinanate as dewatering aids with mineral slurries. None of the above cited patents teach the use of any organopolysiloxanes as mineral slurry dewatering aids.

U.S. Pat. No. 4,290,896 (issued Sept. 22, 1981) discloses that a wide variety of organopolysiloxanes can be employed as dewatering aids for fine coal. The use of organopolysiloxanes as dewatering aids in the processing of mineral slurries was not taught nor disclosed in this patent. Indeed, U.S. Pat. No. 4,290,896 does not even allude to such a use. The organopolysiloxanes of U.S. Pat. No. 4,290,896 were described by the general formula

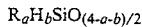

where (a+b) varies from greater than zero to less than 4, b varies from 0 to a, and R is an organic radical bonded to a silicon atom by a silicon-carbon bond. R in the above formula denotes any organic radical, such as any hydrocarbon radical such as any alkyl, alkenyl, alkynyl, cycloaliphatic, aryl or arylalkyl radical, or any substituted hydrocarbon radical wherein said substituents include halogen, hydroxy, alkoxy, aryloxy, carboxy, carbalkoxy, amino, substituted amino, polyalkyleneoxy, mercapto, substituted mercapto, polyalkyleneimine, amide, nitro, and the like.

As is well known in the art, coal and mineral slurries are very different indeed. Coal slurries consists essentially of organic molecules whereas the mineral slurries consist essentially of inorganic molecules. Therefore, it is surprising that I have found that certain of the same organopolysiloxanes useful in the dewatering of fine coal are effective in the dewatering of minerals.

In spite of the effectiveness of dewatering aids which have been employed with mineral slurries, there nevertheless still exists the need for improved dewatering aids which provide lower residual water in the separated concentrate and/or more efficient separation of the mineral concentrate and which results in advantages thereby. Considering annual processing of many millions of tons of mineral ores, such advantages could provide substantial saving in shipping, processing, and capital costs. The provision for improved dewatering aids, therefore, would fulfill a long-felt need and constitute a significant advance in the art.

Therefore an object of this invention is to provide an improved dewatering aid for mineral slurries. Another object of this invention is to provide an improved dewatering aid for mineral slurries containing aluminum, copper, iron, lead, silver, zinc ores, talc, or barite.

SUMMARY OF INVENTION

This invention relates to a process for dewatering an aqueous slurry of a mineral, said process comprising (A) mixing said aqueous slurry with a dewatering improving amount of an aqueous emulsion consisting essentially of (1) an aminofunctional silicone, (2) water, and (3) at least one surfactant and (B) thereafter separating the mixture formed in step (A) into an aqueous portion and a mineral portion.

Many different minerals may be treated by the process of this invention so long as an improvement in the dewatering process, as defined herein, is obtained. Mineral slurries containing aluminum ore, copper ore, iron ore, lead ore, silver ore, zinc ore, talc, and barite are preferred for processing using the dewatering aid of this invention. These mineral slurries or concentrates may contain sulfides or oxides as well as other mineral ores. Talc is a naturally occurring hydrous magnesium silicate; barite is a sulfate of barium.

The aminofunctional silicones useful in the present invention must contain amino or substituted amino radicals and must be water-dispersible or emulsifiable in water. Aminofunctional silicones especially useful in this invention have the general formula

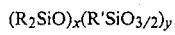

where R is an alkyl radical containing from 1 to 4 carbon atoms and R' is a monovalent organic radical containing at least one amino group where R' is attached to Si through a Si-C bond, where y is greater than or equal to 1 and where the sum (x+y) is between 2 and 1000. R in the above formula can be methyl, ethyl, propyl, or butyl. R' in the above formula can be, for example, —CH$_2$NH$_2$, —CH$_2$CH$_2$NH$_2$, —CH$_2$CH$_2$CH$_2$NH$_2$, —CH$_2$CH$_2$CH$_2$CH$_2$NH$_2$, —CH$_2$CH$_2$CH$_2$NHCH$_3$, —CH$_2$CH$_2$CH$_2$NHCH$_2$CH$_3$, —CH$_2$CH$_2$CH$_2$NHCH$_2$CH$_2$NH$_2$, and like radicals. The aminofunctional silicones as described in the above formula may also contain various end-blocking siloxane units as, for example, (CH$_3$)$_3$SiO$_{\frac{1}{2}}$ and HO(CH$_3$)$_2$SiO$_{\frac{1}{2}}$. The most preferred aminofunctional silicones for the practice of this invention are those where R is a methyl radical and R' is —CH$_2$CH$_2$CH$_2$NHCH$_2$CH$_2$NH$_2$.

The aminofunctional organopolysiloxanes of this invention may be prepared by any of the known methods of the art. These organopolysiloxanes are well known in the art and many are commercially available. Various examples of the preparation of these amino-functional organopolysiloxanes can be found in British Pat. No. 942,587 (published Nov. 27, 1963) and U.S. Pat. No. 3,355,424 (issued Nov. 28, 1967).

Aqueous emulsions of the aminofunctional siloxane can be prepared by emulsifying the aminofunctional siloxane in an aqueous medium using one or more surfactants or by emulsion polymerization of the appropriate monomers in the presence of one or more surfactants.

The surfactants may be anionic, ionic, cationic, amphoteric, or mixtures thereof. The only requirement for the surfactant is that it must allow for the formation of a reasonably stable emulsion of the desired aminofunctional silicone. Anionic surfactants include carboxylates, sulfonates, sulfates, and phosphate esters. Nonionic surfactants include polyoxyethylene derivatives of fatty alcohols, carboxylic esters, and carboxylic amides. Cationic surfactants include amines and quaternary ammonium salts. Examples of such suitable surfactants include sulfonic acids which have the general formula $R^2C_6H_4SO_3H$ and the general formula $R^3O(C_2H_4O)_m SO_3H$ wherein $R^2$ is an aliphatic monovalent hydrocarbon group having at least 6 carbon atoms, $R^3$ is an aliphatic monovalent hydrocarbon group having at least 6 carbon atoms or an aryl group substituted by an aliphatic monovalent hydrocarbon group having at least 6 carbon atoms, and m has an average value of 1 to 15. Specific examples of the sulfonic acids are hexylbenzenesulfonic acid, octylbenzenesulfonic acid, decylbenzenesulfonic acid, dodecylbenzenesulfonic acid, cetylbenzenesulfonic acid, myristylbenzenesulfonic acid, $CH_3(CH_2)_6CH_2O(C_2H_4O)_2SO_3H$, $CH_3(CH_2)_8CH_2O(C_2H_4O)_3SO_3H$, $CH_3(CH_2)_{10}CH_2O(C_2H_4O)_4SO_3H$ and $CH_3(CH_2)_2CH_2—C_6H_4O(C_2H_4O)_2—SO_3H$. In addition, naphthylphosphonic acids with long chain alkyl substituents can also be used.

In general it is preferred that cationic surfactants be used in preparing emulsions for use in the present invention. The quaternary ammonium salts are the preferred cationic surfactants. These preferred quaternary ammonium salt surfactants are described by the general formula

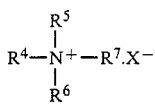

wherein $R^4$ is an aliphatic monovalent hydrocarbon group having at least 6 carbon atoms, $R^5$–$R^7$ are monovalent organic groups; and X is a halogen atom. Specific examples of the quaternary ammonium salts are octyltrimethylammonium chloride, dodecyltrimethylammonium chloride, hexadecyltrimethylammonium chloride, octyldimethylbenzylammonium chloride, decyldimethylbenzylammonium chloride, didodecyldimethylammonium chloride and dioctadecyldimethylammonium chloride.

The surfactant is used in amounts sufficient to emulsify the aminofunctional silicone. Usually this amount is within a range of 0.5 to 25 parts by weight per 100 parts by weight of the aminofunctional silicone.

The amount of water used to form the emulsion is not particularly restricted. However, water is usually present at a level of 100–500 parts by weight per 100 parts by weight of the amino-functional silicone. Higher or lower amounts of water may be employed so long as reasonably stable emulsions are obtained.

In carrying out the present invention, an aqueous mineral slurry is treated with a dewatering-improving amount of the described dewatering aid. By "dewatering-improving amount" it is meant that the dewatering aid is added in amount sufficient to yield improvements in the dewatering process. Such improvements can include a reduction in the water content of the dewatered mineral ore, faster through-put or rate of separation in the dewatering process, faster drying time for the mineral ore, or decreased energy usage as well as other improvements. The dewatering-improving amount of the dewatering aid will generally vary depending on such factors as the specific mineral ore to be dewatered, the specific aminofunctional silicone used, and the like. The amount required is best determined by a few routine experimental tests. Generally, however, the aminofunctional silicone should be employed at a level greater than or equal to 0.1 parts by weight of the aminofunctional silicone per every 1000 parts by weight of the mineral ore in the aqueous slurry.

After treatment of the mineral slurry with a dewatering-improving amount of the aminofunctional silicone the aqueous slurry is separated into an aqueous portion and a mineral portion by appropriate means. Such separating means include, for example, vacuum filtration, pressure filtration, gravity filtration, solid-bowl centrifugation, screen-bowl centrifugation and suitable combinations of the various separating means.

The following examples further describe and teach the process of this invention and are not intended to limit the invention.

EXAMPLE 1

An aminofunctional siloxane was prepared by polymerizing dimethylsiloxane cyclics and N-(β-aminoethyl)-γ-aminopropyltrimethoxysilane in the presence of a cationic surfactant. A mixture of 35 parts by weight dimethylsiloxane cyclics, $[(CH_3)_2SiO]_x$ where x is 4–6, 7 parts by weight of 27 weight percent solution of tallow trimethylammonium chloride in water (Arquad T27W from Armak Chemical Div., Chicago, Ill.), and 55 parts by water was prepared. The pH of this mixture was adjusted to about 11 by the addition of aqueous sodium hydroxide. Then 0.65 parts by weight of N-(β-aminoethyl)-γ-aminopropyltrimethoxysilane was added slowly with agitation. The resulting mixture was heated to about 85° C. for eight hours. The pH was adjusted to about 7.6 by the addition of aqueous hydrochloric acid. Finally, 1.7 parts by weight of an alkylphenoxy polyoxyethylene ethanol nonionic surfactant (tradename Nakon 10 from Stepan Chemical Co., Northfield, Ill.) and 0.2 parts by weight sodium benzoate was added to the emulsion.

The resulting cationic emulsion contained about 35 weight percent silicone and was milky white in appearance. The aminofunctional silicone had the average formula

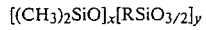

where R is $—CH_2CH_2CH_2NHCH_2CH_2NH_2$, where the ration x/y is about 200 on a molar basis, and where the sum of (x+y) is less than 1000. It appears reasonable to assume that there are hydroxyl end blocking siloxane units present as well.

An aluminum ore containing alumina trihydrate was employed to evaluate the above described aminofunctional silicone as a dewatering aid. The aqueous aluminum ore slurry was from Alcan international, Kingston, Ontario, Canada and contained about 60 percent by weight solids. The pH of the aluminum ore slurry was adjusted to about 11. Various amounts of the above described aminofunctional silicone were mixed with the aluminum ore slurry. The sample were filtered either immediately after addition of the aminofunctional silicone or ten minutes after the addition. Separation was carried out by a vacuum filtration procedure which is referred to throughout these examples as "bottom feed." The samples were filtered using a laboratory disc filter (supplied by Eimco Process Equipment Co., Salt Lake City, Utah) with a polyester type filter medium. The filter area was about 0.1 square feet and the vacuum was about 20 inches of mercury. The filter was plunged directly into the slurry so that the slurry is drawn up through the filter and the solids are collected on the filter medium. The filter was immersed in the slurry for 15 seconds (the formation time). After removal of the filter from the slurry, air was drawn through the filter cake for 2 minutes (the dry time). The filter cake was then analyzed by drying the cake at 110° C. to a constant weight. The following results were obtained. Table I gives the results where the filtration was carried out immediately after addition of the aminofunctional silicone.

TABLE I

| SILICONE LEVEL (g/kg) | WEIGHT (g) OF CAKE | | PERCENT MOISTURE |
|---|---|---|---|
| | Wet | Dry | |
| 0 | 34.7 | 25.2 | 27.4 |
| 0.1 | 44.1 | 31.4 | 28.7 |
| 0.2 | 65.7 | 54.9 | 16.4 |
| 0.5 | 74.8 | 64.6 | 13.8 |

It can be easily seen that levels of the aminofunctional silicone at 0.2 g of silicone and greater/kg aluminum ore yield a significant improvement in both the moisture content of the wet filter cake and in the total amount of solids pick-up.

Table II gives the results where the filtration was carried out ten minutes after addition of the aminofunctional silicone.

TABLE II

| SILICONE LEVEL (g/kg) | WEIGHT (g) OF CAKE | | PERCENT MOISTURE |
|---|---|---|---|
| | Wet | Dry | |
| 0 | 34.7 | 25.2 | 27.4 |
| 0.1 | 57.2 | 45.3 | 20.8 |
| 0.2 | 73.4 | 62.5 | 14.9 |
| 0.5 | 75.3 | 65.0 | 13.7 |

These results show that the there is a significant improvement in the dewatering ability of the aminofunctional silicone emulsion when there is a short delay between the time of addition of the dewatering aid and the separation step. When the dewatering aid is used at 0.5 g/kg there is a 50 percent improvement in the moisture content of the wet cake and a 158 percent improvement in the solids pick-up relative to the blank run.

EXAMPLE 2

An Alumina trihydrate slurry containing 61.5 percent solids from Alcan International was employed in this example. The same dewatering aid as described in Example 1 was used. The filtering procedure was modified to allow for top feeding of the slurry into the filter. The use of the "top feed" procedure allows for determination of moisture reduction independent of solids pick-up since equal aliquots of the variously treated slurries are filtered which allow for a constant filter cake thickness. Samples were filtered about 10 minutes after the addition of the dewatering aid. A vacuum of about 15 inches of mercury was used in the filtration. After the filtration was completed air was drawn through the filter cake for 40 sec.

| SILICONE LEVEL (g/kg) | PERCENT MOISTURE |
|---|---|
| 0 | 16.0 |
| 0.02 | 10.5 |
| 0.04 | 9.4 |
| 0.06 | 9.0 |
| 0.08 | 9.7 |
| 0.10 | 8.9 |

EXAMPLE 3

This example shows the use of an aminofunctional silicone dewatering aid with a copper ore slurry. The porphyry copper ore slurry was from Gibraltar Mines, McLeese Lake, British Columbia, Canada and contained about 70 percent solids. The bottom feed filtration method as described in Example 1 was used with a formation time of 80 seconds, a drying time of 90 seconds, and a vacuum of 20 inches of mercury. The filter medium was a canvas duckcloth. The sample was filtered about 10 minutes after addition of the dewatering aid. The aminofunctional silicone emulsion was the same as described in Example 1.

| SILICONE LEVEL (g/kg) | WEIGHT (g) OF CAKE | | PERCENT MOISTURE |
|---|---|---|---|
| | Wet | Dry | |
| 0 | 65.8 | 53.1 | 19.4 |
| 0.05 | 90.9 | 74.5 | 18.0 |
| 0.1 | 114.6 | 95.7 | 16.4 |
| 0.25 | 176.45 | 153.5 | 13.0 |

At a level of 0.25 g silicone per kg of solids the dewatering aid showed a 33 percent reduction in moisture content and a 154 percent increase of solids pick-up relative to the blank.

EXAMPLE 4

The example shows the use of the dewatering aids of this invention in a commercial vacuum disc filter using an iron ore slurry. The same dewatering aid as described in Example 1 was used. The iron ore slurry was from the Sherman Mines, Temagami, Ontario, Canada and had a solids content of about 45 percent.

Both the moisture content and production rates were monitored throughout the test. The process initially ran for about 3.5 hours without any added aminofunctional dewatering aid. Over the next two hours, the dewatering aid was added continuously by means of a pump at a rate of 0.005 g silicone/kg of slurry solids. The rate was then increased to 0.01 g silicone/kg of slurry solids and held constant for 2.5 hours. Finally another blank was run. Samples for analysis were taken about every half hour. The averaged results are presented below.

| SILICONE LEVEL (g/kg) | PRODUCTION RATE (TONS/HOUR) | MOISTURE CONTENT (%) |
|---|---|---|
| 0* | 117 | 10.2 |
| 0.005 | 131 | 9.9 |
| 0.01 | 148 | 9.4 |
| 0** | 135 | 10.3 |

*Initial blank sample
**Final blank sample

A significant improvement was noted during the time the aminofunctional silicone was being added to the iron slurry.

EXAMPLE 5

This example shows the use of the same aminofunctional silicone emulsion dewatering aid as described in Example 1 with a lead ore slurry. The lead ore slurry, containing about 79 percent solids, was from Cominco Mines, Kimberly, British Columbia, Canada. The vacuum filtration was carried out using the bottom feed procedure with a formation time of 68 seconds, a dry time of 173 seconds, and a vacuum of about 27 inches mercury. Samples were filtered about 10 minutes after addition of the dewatering aid using a canvas duckcloth, otherwise the procedures were as described in Example 1.

| SILICONE LEVEL (g/kg) | DRY CAKE PRODUCTION (kg/hour · ft²) | MOISTURE CONTENT (%) |
|---|---|---|
| 0 | 157.2 | 9.7 |
| 0.02 | 158.5 | 10.1 |
| 0.05 | 174.4 | 9.7 |
| 0.1 | 184.1 | 9.6 |
| 0.25 | 209.6 | 9.7 |

The dewatering aid had little effect on the moisture content of filter cake. Production, however, was significantly improved with increasing silicone level. At a 0.25 g silicone/kg solid level, the production of filter cake increased by about 35 percent.

EXAMPLE 6

A silver ore slurry (57.9 percent solids) from Teck Corporation, Cobalt, Ontario, Canada was employed in the method of this invention. The aminofunctional silicone of Example 1 was also used in this example. The bottom feed method of filtration was employed with a formation time of 20 seconds, a dry time of 30 seconds, and a vacuum of about 30 inches of mercury. The filter medium was a canvas duckcloth. Samples were filtered about 10 minutes after addition of the dewatering aid. The following results were obtained.

| SILICONE LEVEL (g/kg) | WEIGHT (g) OF CAKE Wet | WEIGHT (g) OF CAKE Dry | PERCENT CONTENT (%) |
|---|---|---|---|
| 0 | 58.6 | 50.1 | 14.5 |
| 0.02 | 60.9 | 51.9 | 14.7 |
| 0.05 | 78.1 | 67.9 | 13.1 |
| 0.1 | 89.0 | 77.9 | 12.4 |
| 0.25 | 118.3 | 104.6 | 11.5 |

At a level of 0.25 g silicone per 1000 g mineral solids a 21% reduction in moisture content and a 109% increase in solids pick-up was observed.

EXAMPLE 7

A zinc sulfide mineral slurry from Kidd Creek Mines, Timmins, Ontario, Canada was evaluated using the same aminofunctional silicone as used in Example 1. The bottom feed method of filtration was employed with variable formation and drying times. Samples were filtered about 10 minutes after addition of the dewatering aid using a canvas duckcloth as the filter medium.

| SILICONE LEVEL (pounds/ton) | Formation Time (min) | Dry Time (min) | Moisture Content (%) | Filter Cake Thickness (inches) |
|---|---|---|---|---|
| 0 | 0.75 | 1.0 | 18.8 | 0.38 |
| 0.43 | 0.75 | 1.0 | 15.9 | 0.69 |
| 0 | 1.2 | 1.6 | 18.4 | 0.50 |
| 0.43 | 1.2 | 1.6 | 17.5 | 0.88 |
| 0 | 1.5 | 2.0 | 18.5 | 0.50 |
| 0.43 | 1.5 | 2.0 | 17.4 | 0.88 |
| 0 | 3.0 | 4.0 | 17.1 | 0.75 |
| 0.43 | 3.0 | 4.0 | 17.4 | 1.25 |

These results demonstrate at least a 75% increase in cake thickness without any increase (or perhaps even a decrease) in the moisture content of the filter cake when using the dewatering aid of this invention.

EXAMPLE 8

A talc slurry from Steetley Industries, Dundas, Ontario, Canada was tested using the same aminofunctional silicone as used in Example 1. The bottom feed method of filtration was used with a formation time of 105 seconds, a dry time of 135 seconds, and a vacuum of about 22 inches, mercury. The talc slurry contained about 20 percent solids. Samples were filtered about 10 minutes after addition of the dewatering aid. The filter medium was a canvas duckcloth, otherwise the procedures were as described in Example 1. The following results were obtained:

| SILICONE LEVEL (g/kg) | DRY CAKE PRODUCTION (kg/hour · ft²) | MOISTURE CONTENT (%) |
|---|---|---|
| 0 | 29.4 | 24.3 |
| 0.1 | 44.8 | 23.0 |
| 0.25 | 49.0 | 22.4 |
| 0.5 | 62.4 | 24.4 |

At a level of 0.5 g dewatering aid per kg of talc solids the dry filter cake production increased by about 112 percent by weight with virtually no change in moisture content.

EXAMPLE 9

The aminofunctional silicone dewatering aid of Example 1 was also evaluated using barite from Asarco Inc., Buchans, Newfoundland, Canada. The aqueous slurry of barite contained about 61 percent solids. The top feed filtration method was employed using a dry time of 210 seconds and a vacuum of about 15 inches mercury. Samples were filtered about 10 minutes after addition of the dewatering aid using a canvas duckcloth as the filter medium. Otherwise the same procedures as outlined in Example 1 were employed.

| SILICONE LEVEL (g/kg) | MOISTURE CONTENT (%) |
|---|---|
| 0 | 4.6 |
| 0.024 | 4.4 |
| 0.048 | 3.7 |
| 0.096 | 3.5 |

That which is claimed is:

1. A process for dewatering an aqueous slurry of a mineral, said process comprising
   (A) mixing said aqueous slurry with a dewatering-improving amount of an aqueous emulsion consisting essentially of (1) an aminofunctional silicone, of the average formula $(R_2SiO)_x(R'SiO_{3/2})_y$ where R is an alkyl radical containing 1 to 4 carbon atoms, where R' is a monovalent organic radical containing at least one amino group and where R' s attached to Si through a Si-C bond, where Y is greater than or equal to 1 and where the sum (x+y) is between 2 and 1000 (2) water, and (3) at least one surfactant and
   (B) thereafter separating the mixture formed in step (A) into an aqueous portion and a mineral portion.

2. A process as defined in claim 1 wherein said mineral is selected, from the group consisting of aluminum ore, copper ore, iron ore, lead ore, silver ore, zinc ore, talc and barite.

3. A process as defined in claim 2 wherein said surfactant is selected from the group consisting of sulfonic acids which have the general formula $R^2C_6H_4SO_3H$ and the general formula $R^3O(C_2H_4O)_mSO_3H$ wherein $R^2$ is an aliphatic monovalent hydrocarbon group having at least 6 carbon atoms, $R^3$ is an aliphatic monovalent hydrocarbon group having at least 6 carbon atoms or an aryl group substituted by an aliphatic monovalent hydrocarbon group having at least 6 carbon atoms, and m has an average value of 1 to 15 and quaternary ammonium salts of the general formula

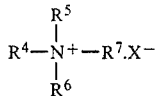

wherein $R^4$ is an aliphatic monovalent hydrocarbon group having at least 6 carbon atoms, $R^5$-$R^7$ are monovalent organic groups, and X is an halogen atom.

4. A process as defined in claim 2 wherein R' is $-(CH_2)_3NH(CH_2)_2NH_2$.

5. A process as defined in claim 4 wherein R is a methyl radical.

6. A process as defined in claim 5 wherein said surfactant is a quaternary ammonium salt of general formula

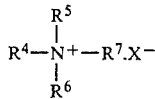

wherein $R^4$ is an aliphatic monovalent hydrocarbon group having at least 6 carbon atoms, $R^5$-$R^7$ are monovalent organic groups, and X is an halogen atom.

7. A process as defined in claim 6 wherein said surfactant is tallow trimethylammonium chloride.

8. A process as defined in claim 7 wherein said separating step consists of vacuum filtration.

9. A process as defined in claim 4 wherein said surfactant is a quaternary ammonium salt of general formula

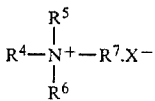

wherein $R^4$ is an aliphatic monovalent hydrocarbon group having at least 6 carbon atoms, $R^5$-$R^7$ are monovalent organic groups, and X is an halogen atom.

10. A process as defined in claim 9 wherein said surfactant is tallow trimethylammonium chloride.

11. A process as defined in claim 4 wherein said separating step consists of vacuum filtration.

12. A process as defined in claim 9 wherein said separating step consists of vacuum filtration.

13. A process as defined in claim 4 wherein said mineral is aluminum ore.

14. A process as defined in claim 4 wherein said mineral is copper ore.

15. A process as defined in claim 4 wherein said mineral is iron ore.

16. A process as defined in claim 4 wherein said mineral is lead ore.

17. A process as defined in claim 4 wherein said mineral is silver ore.

18. A process as defined in claim 4 wherein said mineral is zinc ore.

19. A process as defined in claim 4 wherein said mineral is talc.

20. A process as defined in claim 4 wherein said mineral is barite.

* * * * *

UNITED STATES PATENT AND TRADEMARK OFFICE
CERTIFICATE OF CORRECTION

PATENT NO. : 4,525,281
DATED : June 25, 1985
INVENTOR(S) : Ian V. Cooper

It is certified that error appears in the above-identified patent and that said Letters Patent is hereby corrected as shown below:

Abstract, line 2, "silicone" should read -- silicon --.

Column 1, line 37, "sulfosuccinanate" should read -- sulfosuccinate --.

Column 5, line 11, "sample" should read -- samples --.

Signed and Sealed this

Ninth Day of December, 1986

Attest:

DONALD J. QUIGG

*Attesting Officer*  *Commissioner of Patents and Trademarks*